(12) United States Patent
Hong et al.

(10) Patent No.: US 12,494,318 B2
(45) Date of Patent: Dec. 9, 2025

(54) MAGNETIC COMPONENT

(71) Applicant: Delta Electronics (Shanghai) CO., LTD, Shanghai (CN)

(72) Inventors: Tianding Hong, Shanghai (CN); Zengyi Lu, Shanghai (CN); Haijun Yang, Shanghai (CN); Jinfa Zhang, Shanghai (CN)

(73) Assignee: Delta Electronics (Shanghai) CO., LTD., Shanghai (CN)

( * ) Notice: Subject to any disclaimer, the term of this patent is extended or adjusted under 35 U.S.C. 154(b) by 931 days.

(21) Appl. No.: 17/551,628

(22) Filed: Dec. 15, 2021

(65) Prior Publication Data
US 2022/0208439 A1 Jun. 30, 2022

(30) Foreign Application Priority Data
Dec. 24, 2020 (CN) .......................... 202011545467.6

(51) Int. Cl.
*H01F 27/29* (2006.01)
*H01F 3/14* (2006.01)
(Continued)

(52) U.S. Cl.
CPC ............ *H01F 27/306* (2013.01); *H01F 3/14* (2013.01); *H01F 27/2866* (2013.01);
(Continued)

(58) Field of Classification Search
CPC ...... H01F 27/306; H01F 3/14; H01F 27/2866; H01F 27/29; H01F 27/263;
(Continued)

(56) References Cited

U.S. PATENT DOCUMENTS
2011/0025445 A1 2/2011 Lai et al.

FOREIGN PATENT DOCUMENTS
CN 104332276 A 2/2015
CN 103370753 B 1/2016
(Continued)

OTHER PUBLICATIONS

1st Office Action dated Aug. 1, 2024 of Chinese Application No. 202011545467.6.
2nd Office Action dated Dec. 18, 2024 of Chinese Application No. 2020115454676.

*Primary Examiner* — Tuyen T Nguyen
(74) *Attorney, Agent, or Firm* — Qinghong Xu

(57) ABSTRACT

A magnetic component includes two covers, two magnetic columns between the two covers, a winding frame and windings. Each of the magnetic columns includes at least three magnetic blocks. Spacers are arranged between two adjacent magnetic blocks and/or between the magnetic block and the cover. The spacers form air gaps of a magnetic circuit of the magnetic component. The winding frame includes two extension parts and base arranged at ends of the two extension parts. A limiting part is provided on the base. The windings are arranged around the extension parts, each of the windings includes a winding wire and at least one lead terminal at an end of the winding wire. The winding wire of the winding is a flat wire, and a winding mode of the flat wire around the extension part is a vertical winding; the at least one lead terminal is limited by the limiting part.

9 Claims, 9 Drawing Sheets

(51) Int. Cl.
  *H01F 27/28* (2006.01)
  *H01F 27/30* (2006.01)
  *H01F 27/32* (2006.01)
  *H02M 1/00* (2006.01)
  *H02M 1/42* (2007.01)
(52) U.S. Cl.
  CPC ........... *H01F 27/29* (2013.01); *H01F 27/325* (2013.01); *H02M 1/0064* (2021.05); *H02M 1/42* (2013.01)
(58) Field of Classification Search
  CPC .... H01F 27/2847; H01F 27/325; H01F 37/00; H02M 1/0064; H02M 1/42; H02M 1/4266
  See application file for complete search history.

(56) References Cited

FOREIGN PATENT DOCUMENTS

| | | | | |
|---|---|---|---|---|
| CN | 103050226 | B | 9/2016 | |
| CN | 107731441 | A | 2/2018 | |
| CN | 207165379 | U | 3/2018 | |
| CN | 106803458 | B | 6/2018 | |
| CN | 108305743 | A | 7/2018 | |
| CN | 208706405 | U | 4/2019 | |
| CN | 211957383 | U | 11/2020 | |
| CN | 213635634 | U | 7/2021 | |
| DE | 112007002205 | T5 * | 8/2009 | ........... H01F 27/263 |
| JP | 5893505 | B2 * | 3/2016 | ........... H01F 27/306 |
| JP | 2020080355 | A * | 5/2020 | |
| KR | 94001385 | Y1 * | 3/1994 | |
| KR | 20120077163 | A | 7/2012 | |

\* cited by examiner

MAGNETIC COMPONENT

CROSS REFERENCE

This application is based upon and claims priority to Chinese Patent Application No. 202011545467.6, filed on Dec. 24, 2020, the entire contents thereof are incorporated herein by reference.

TECHNICAL FIELD

The disclosure relates to a magnetic component.

BACKGROUND

In the field of a power supply, as increasing of power density of the power supply, it is important to reduce loss of the magnetic component and improve heat dissipation conditions.

Conventional Power Factor Correction (PFC) inductor for a server power supply mainly includes two types, one is a PFC inductor with an annular powder core around which an enameled wire is wound, which has a large induction loss and is difficult to improve the low load efficiency; and the other is a PFC inductor with a ferrite core around which Litz wire are wound, which has large full load loss and poor heat dissipation performance.

SUMMARY

The present disclosure provides a magnetic component with small winding loss and high heat dissipation efficiency.

According to one aspect of the present disclosure, it is provided with a magnetic component including two covers, two magnetic columns between the two covers, a winding frame and windings. Each of the magnetic columns comprises at least three magnetic blocks, spacers are arranged between two adjacent magnetic blocks and/or between the magnetic block and the cover, and the spacers form air gaps of a magnetic circuit of the magnetic component. The winding frame comprising two extension parts and a base arranged at ends of the two extension parts, wherein the two extension parts are perpendicular to the base, a limiting part is provided in the base, each of the two extension parts has a through channel through which the magnetic column passes. Windings arranged around the two extension parts respectively, wherein the winding comprises a winding wire and at least one lead terminal at an end of the winding wire, the winding wire of the winding is a flat wire, and a winding mode of the flat wire around the two extension parts are a vertical winding, wherein the at least one lead terminal after being bent is limited by the limiting part. Wherein the magnetic component is a power factor correction inductor, and a current flowing through the winding includes a line frequency current and a high frequency current.

According to one embodiment of the present disclosure, wherein the base comprises a supporting part connected to one end of the extension part, and the limiting part is arranged at one side of the supporting part.

According to one embodiment of the present disclosure, wherein the limiting part is provided with a through hole or a groove through which the lead terminal vertically pass, wherein the groove is formed by extending an outer edge of the limiting part to an inner direction of the limiting part.

According to one embodiment of the present disclosure, wherein a protrusion for pressing and fixing the lead terminal is arranged within the groove.

According to one embodiment of the present disclosure, wherein the spacer comprises an insulation sheet or a granular adhesive.

According to one embodiment of the present disclosure, wherein the at least three magnetic blocks have the same size.

According to one embodiment of the present disclosure, wherein the cross-sectional of the winding is contoured as a circular, a racetrack-shape or a rectangular with chamfers.

According to one embodiment of the present disclosure, wherein the winding frame comprises one base, and the two extension parts are arranged on the base.

According to one embodiment of the present disclosure, wherein the winding frame comprises two bases, and the two extension parts are respectively arranged on the two bases.

According to one embodiment of the present disclosure, wherein the magnetic component comprises two windings which are respectively arranged around the two extension parts, and the two windings are formed by winding one winding wire and the two windings totally have two lead terminals, wherein at least one of the two lead terminals is limited by the limiting part of the base.

According to one embodiment of the present disclosure, wherein the magnetic component comprises two windings which are respectively arranged around the two extension parts, and each of the two windings is formed by winding one winding wire and the two windings totally have four lead terminals, wherein at least one of the lead terminals of each of the windings is limited by the limiting part of the base.

BRIEF DESCRIPTION OF THE DRAWINGS

The above and/or other features and advantages will become more apparent from the detailed description of the exemplary embodiments, taken in conjunction with the accompanying drawings.

DETAILED DESCRIPTION

Now, the exemplary implementations will be described more completely with reference to the accompanying drawings. However, the exemplary implementations can be done in various forms and should not be construed as limiting the implementations as set forth herein. Instead, these implementations are provided so that the present disclosure will be thorough and complete, and concept of the exemplary implementation will be fully conveyed to those skilled in the art. Same reference numbers denote the same or similar structures in the figures, and thus the detailed description thereof will be omitted.

A magnetic component according to one embodiment of the present disclosure may be a power factor correction inductor, and a current flowing through the winding includes a line frequency current and a high frequency current.

The magnetic component according to one embodiment of the present disclosure includes two covers, two magnetic columns arranged between the two covers, a winding frame and windings. The winding frame includes two extension parts through which two magnetic columns pass, and a base. The base is provided with a limiting part. Each of the magnetic columns includes at least three magnetic blocks and a plurality of spacers, and the at least three magnetic blocks and the plurality of spacers are alternately arranged, thereby forming a magnetic column with multiple air gaps. The winding is formed by vertical winding of a flat wire, and at least one lead terminal of the winding after being curved is limited by the limiting part of the base.

According to the magnetic component of the present disclosure, a direct current resistance is reduced by the windings adopting a flat wire vertical winding mode, thereby reducing the loss caused by the line frequency current while improving the heat dissipation efficiency; The winding loss caused by the high frequency current is reduced by using magnetic columns with multiple air gaps; and the lead terminal is limited by arranging the limiting part on the winding frame, to improve automation of manufacturing the magnetic component.

Figure 1:
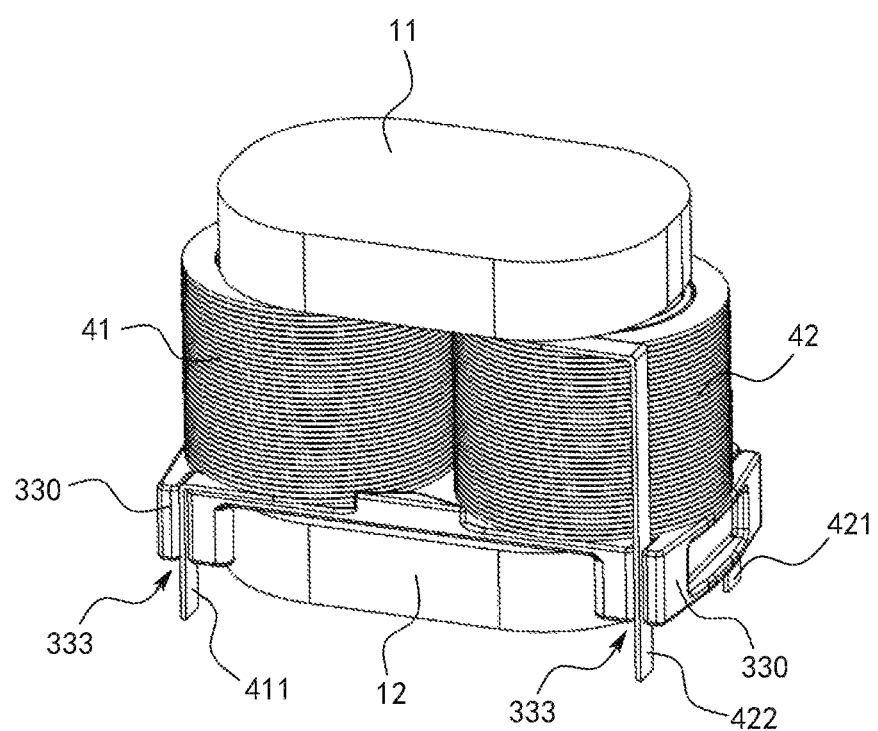
FIG. 1 is an assembled perspective view of the magnetic component according to one embodiment of the present disclosure.
Figure 2:
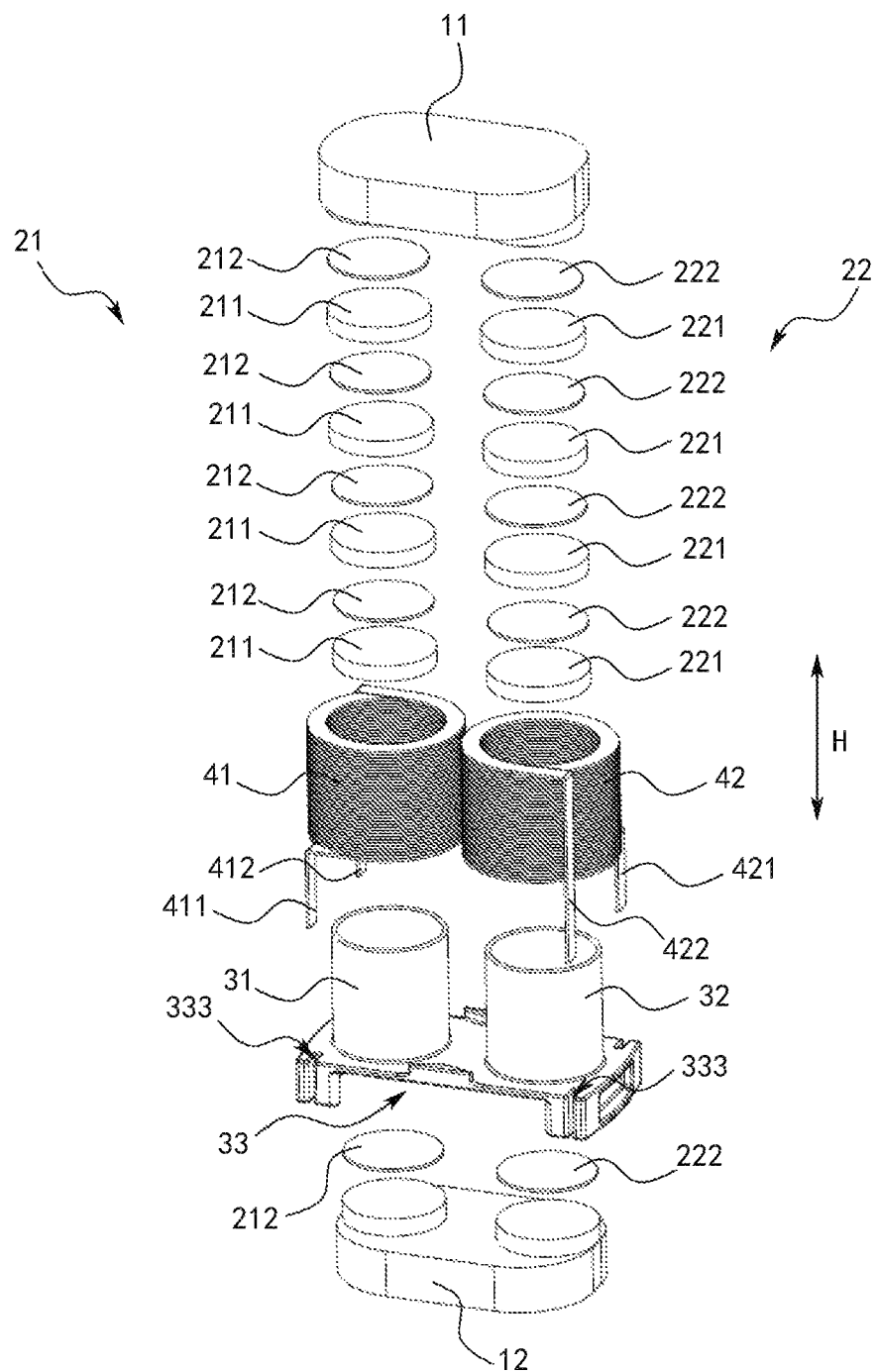
FIG. 2 is an exploded perspective view of the magnetic component shown in FIG. 1.
Figure 3:
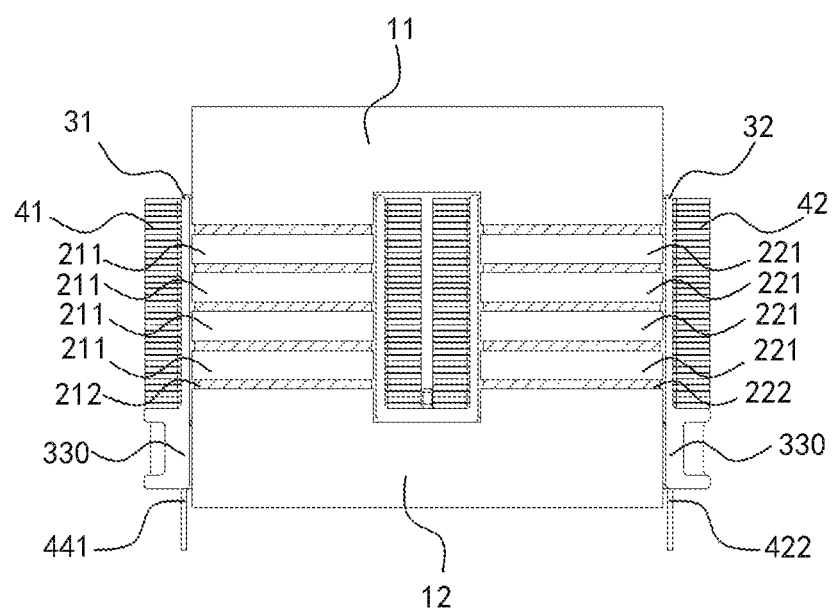
FIG. 3 is a longitudinal sectional view of the magnetic component shown in FIG. 1.

As shown in FIG. 1, FIG. 2 and FIG. 3, FIG. 1 is an assembled perspective view of a magnetic component according to one embodiment of the present disclosure; FIG. 2 is an exploded perspective view of the magnetic component shown in FIG. 1; and FIG. 3 is a longitudinal sectional view of the magnetic component shown in FIG. 1.

The magnetic component according to one embodiment of the present disclosure includes two covers, two magnetic columns, a winding frame and windings.

The two covers include an upper cover 11 and a lower cover 12 which are oppositely arranged, for example.

The two magnetic columns include a first magnetic column 21 and a second magnetic column 22, for example. The first magnetic column 21 and the second magnetic column 22 are arranged between the upper cover 11 and the lower cover 12, and may be arranged parallel with each other.

As shown in FIG. 2 and FIG. 3, each of the magnetic columns in the present disclosure includes at least three magnetic blocks. For example, the first magnetic column 21 includes four first magnetic blocks 211 with the same structure and size. In other embodiments, the number of the first magnetic blocks 211 is not limited to four, and the size of the first magnetic blocks 211 may be different, in particular, the size of the first magnetic blocks 211 may be completely different or only partially the same in a height direction H of the magnetic component.

As shown in FIG. 2 and FIG. 3, gaps may be respectively arranged between two adjacent ones of the first magnetic blocks 211, between the first magnetic block 211 and the upper cover 11, and between the first magnetic block 211 and the lower cover 12; each of the gaps may be filled with one sheet of a first spacer 212 which can change magnetic resistance of the first magnetic column 21. The first spacer 212 may be an insulation sheet or a granular adhesive. The function of the first spacer 212 is to form an air gap of the magnetic circuit of the magnetic component. In some other embodiments, the first spacer 212 may not be arranged between the first magnetic block 211 and the upper cover 11 or between the first magnetic block 211 and the lower cover 12.

As shown in FIG. 2 and FIG. 3, the second magnetic column 22 in the present disclosure includes four second magnetic blocks 221 with the same structure and size. In other embodiments, the number of the second magnetic blocks 221 is not limited to four, and the size of the second magnetic blocks 221 may also be different, in particular, the size of the second magnetic blocks 221 may be completely different or only partially the same in the height direction H of the magnetic component.

As shown in FIG. 2 and FIG. 3, gaps may be respectively arranged between two adjacent ones of the second magnetic blocks 221, between the second magnetic block 221 and the upper cover 11, and between the second magnetic block 221 and the lower cover 12; and the gap may be filled with one sheet of a second spacer 222. The second spacer 222 may change magnetic resistance of the second magnetic column 22. The second spacer 222 may be an insulation sheet or a granular adhesive. The function of the second spacer 222 is to form an air gap of the magnetic circuit of the magnetic component. In some other embodiments, the second spacer 222 may not be provided between the second magnetic block 221 and the upper cover 11 or between the second magnetic block 221 and the lower cover 12.

Figure 4:
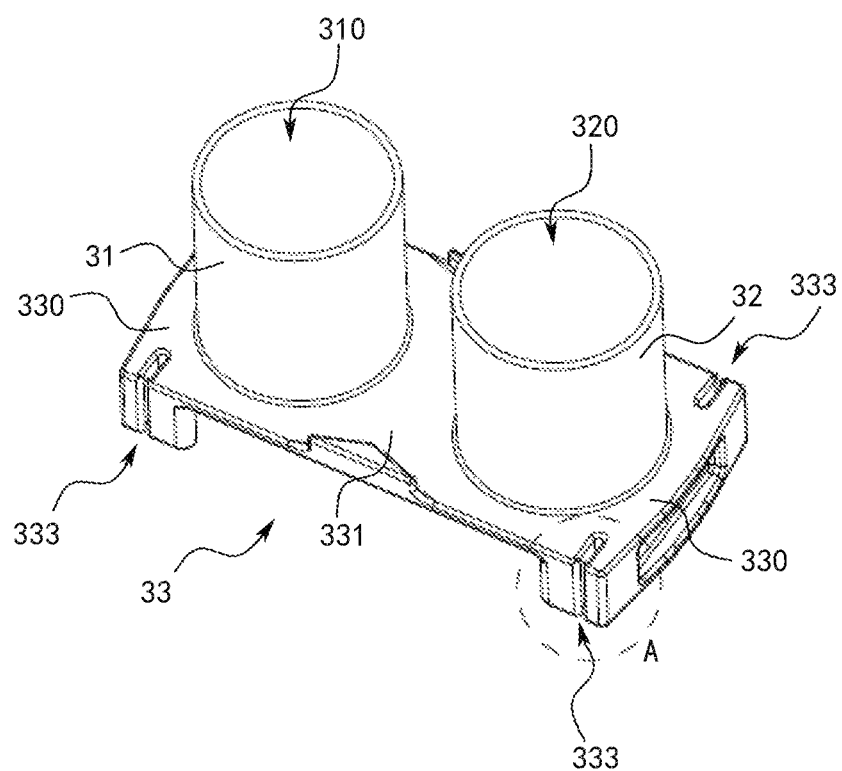
FIG. 4 is a perspective view of one winding frame in the magnetic component shown in FIG. 1.

As shown in FIG. 2 and FIG. 4, FIG. 4 is a perspective view of a winding frame in the magnetic component shown in FIG. 1. The winding frame in the magnetic component according to one embodiment of the present disclosure includes a first extension part 31, a second extension part 32 and a base 33. The base 33 is arranged at ends of the first extending portion 31 and the second extending portion 32. The first extension part 31 and the second extension part 32 may be parallel with each other, that is, center lines of the first extension part 31 and the second extension part 32 are parallel with each other. The first extension part 31 and the second extension part 32 may be perpendicular to the base 33, that is, the center lines of the first extension part 31 and the second extension part 32 may be perpendicular to the plane where the base 33 is positioned. The first extension part 31 has a first through channel 310, and the second extension part 32 has a second through channel 320, and the first magnetic column 21 and the second magnetic column 22 pass through the first through channel 310 and the second through channel 320, respectively.

As shown in FIG. 4, the winding frame of the magnetic component according to one embodiment of the present disclosure may include only one base 33, on which both the first extension part 31 and the second extension part 32 may be arranged.

The base 33 may include a supporting part 331 and two limiting parts 330. The supporting part 331 is connected to bottom ends of the first extension part 31 and the second extension part 32, and the two limiting parts 330 may be arranged at two ends of the supporting part 331.

Figure 5:
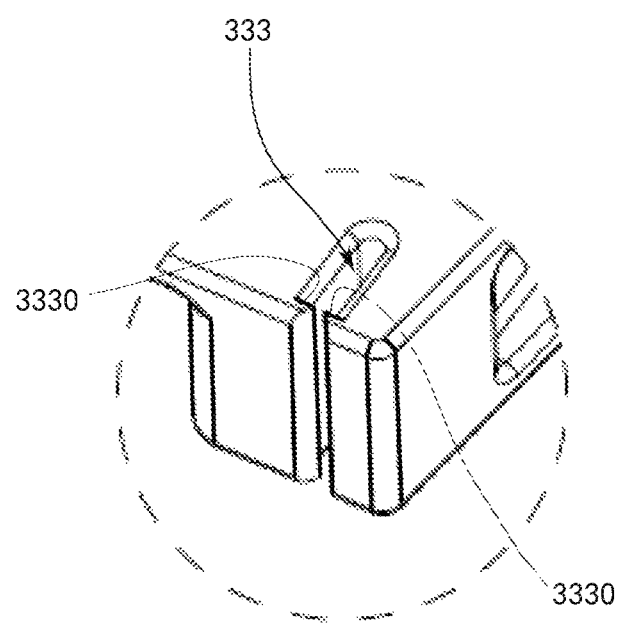
FIG. 5 is an enlarged view of part A in FIG. 4.

As shown in FIG. 4 and FIG. 5, FIG. 5 is an enlarged view of a part in FIG. 4. The limiting part 330 of the base 33 may be provided with a groove 333 through which the lead terminal of the winding vertically passes, wherein the groove 333 may be formed by extending an outer edge of the limiting part 330 to an inner direction of the limiting part 330. A protrusion 3330 may be arranged within the groove 333, and the protrusion 3330 is used for further pressing and fixing the lead terminal. The grooves 333 may be respectively arranged at the front and rear sides of the limiting part 330, as shown in FIG. 4, or the groove is only arranged at one of the front and rear sides of the limiting part 330 (not shown), or the groove 333 is arranged on one side of the limiting part 330 away from the extension part (not shown).

The base shown in FIG. 4 is an integrated structure. As relative positions of the respective lead terminals are secured, the magnetic component including the base is conveniently assembled to a power supply.

Figure 6:
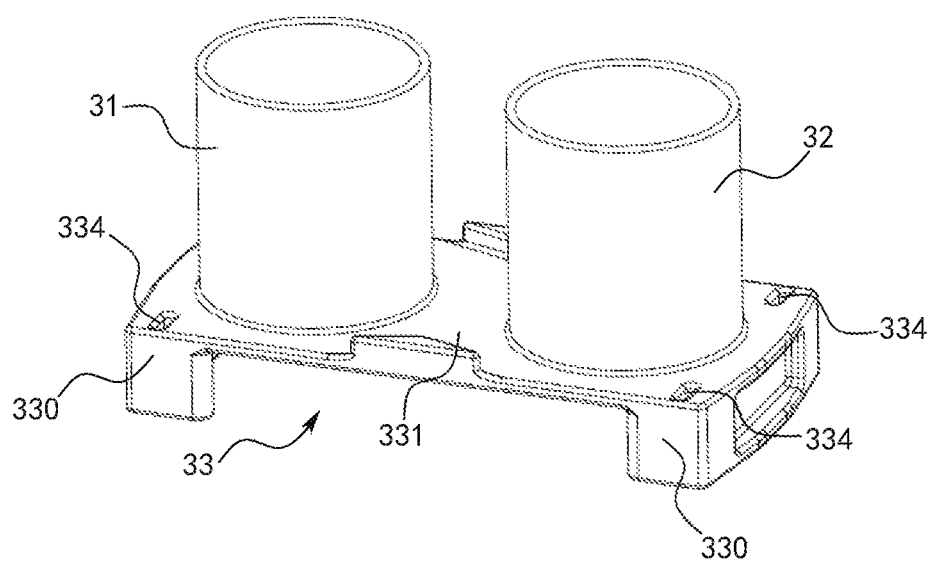
FIG. 6 is a perspective view of another winding frame in the magnetic component according to another embodiment of the present disclosure.

As shown in FIG. 6, FIG. 6 is a perspective view of another winding frame in a magnetic component according to another embodiment of the present disclosure. In another embodiment, the groove 333 on the limiting part 330 of the base 33 may also be replaced by a through hole 334 which vertically passes through the limiting part 330 from top to bottom, so that the lead terminal of the winding can vertically pass through the limiting part 330. In some other embodiments, the through hole 334 may obliquely pass through the limiting part 330 from top to bottom. Other structures of the winding frame shown in FIG. 6 may be basically the same as those shown in FIG. 4. The front and rear sides of the limiting part 330 may be respectively provided with the through hole 334, as shown in FIG. 6; or the through hole (not shown) is only arranged on one side of the front and rear sides of the limiting part 330, or the through hole 334 (not shown) is provided on one side of the limiting part 330 away from the extension part.

The winding frame in the magnetic component of the present disclosure may be provided with a limiting part capable of limiting the lead terminal, which is beneficial to realize an automatic plug-in process after mass production.

Figure 7:
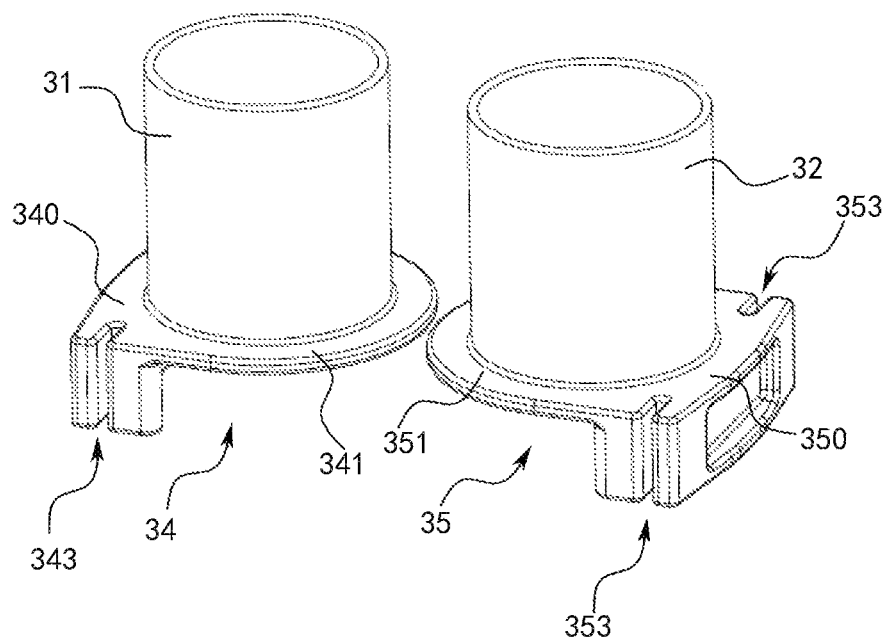
FIG. 7 is a perspective view of yet another winding frame in the magnetic component according to another embodiment of the present disclosure.

As shown in FIG. 7, FIG. 7 is a perspective view of another winding frame in a magnetic component according to yet another embodiment of the present disclosure. In another embodiment, the winding frame may include a first base 34 and a second base 35 that are independent from each other. The first extension part 31 may be arranged on the first base 34, and the second extension part 32 may be arranged on the second base 35.

The first base 34 may include a first supporting part 341 and a first limiting part 340, wherein the first limiting part 340 may be arranged at an end of the first supporting part 341 away from the second base 35. The front and rear sides of the first limiting part 340 may be respectively provided with a first groove 343. The first groove 343 may be replaced by a first through hole.

The second base 35 may include a second supporting part 351 and a second limiting part 350. Wherein the second limiting part 350 may be arranged at an end of the second supporting part 351 away from the first base 34. The front and rear sides of the second limiting part 350 may be respectively provided with a second groove 353. The second groove 353 may also be replaced by a second through hole.

The function of the first groove 343 and the second groove 353 is the same as the groove 333 described above, and will not be described in detail here.

The base shown in FIG. 7 is a combined structure, which may include a first base 34 and a second base 35 that are independent from each other. The two windings may be arranged around the two extension parts respectively. The wire can be wound with the winding frame, and then assembled with the magnetic cores respectively after winding. This process is convenient.

Figure 8:
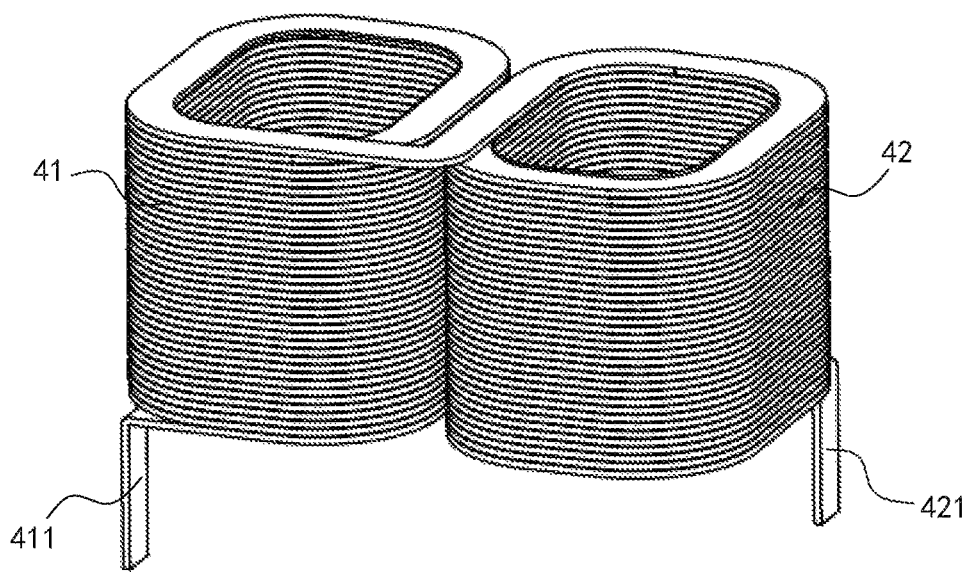
FIG. 8 is a perspective view of another winding in the magnetic component according to another embodiment of the present disclosure.
Figure 9:
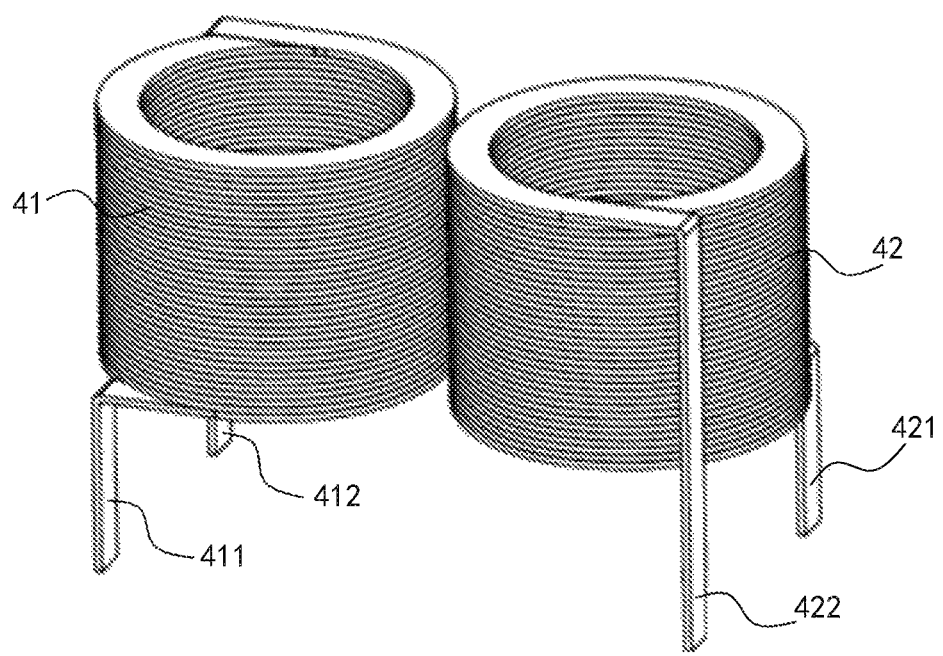
FIG. 9 is a perspective view of one winding in the magnetic component shown in FIG. 1.

As shown in FIG. 8, FIG. 8 is a perspective view of another winding in the magnetic component according to another embodiment of the present disclosure. The winding in the magnetic component according to one embodiment of the present disclosure is arranged around the extension part. The winding includes a first winding 41 and a second winding 42. The cross section of the first winding 41 and the second winding 42 are contoured as a rectangular with chamfers. In some other embodiments, the cross section of the windings may also be round (as shown in FIG. 9) or racetrack-shaped etc. The winding includes a winding and at least one lead terminal positioned at the end of the winding.

As shown in FIG. 8, the first winding 41 and the second winding 42 are formed by winding of one flat wire, so that the winding totally has two lead terminals, that is, a first lead terminal 411 connected to an end of the winding wire of the first winding 41 and a second lead terminal 421 connected to an end of the winding wire of the second winding 42. The first lead terminal 411 and the second lead terminal 421 are bent and extended from the winding to the base, respectively, and pass through the groove or the through hole of the limiting part of the base. In other embodiments, one of the first lead terminal 411 and the second lead terminal 421 may be bent and extended to a direction of the base, and passes through the groove or the through hole of the limiting part of the base, and an out-leading way of the other lead terminal may be arbitrary.

The flat wire refers to a copper sheet with the cross section that is slender and similarly rectangular having the length far greater than the width, and the surface of the copper sheet is provided with an insulation layer. The vertical winding mode is a winding method in which one short side of the flat wire is attached to the extension part and the other long side thereof far away from the extension part is spirally arranged.

As shown in FIG. 9 and in conjunction with FIGS. 1 and 2, FIG. 9 shows a perspective view of a winding in the magnetic component. The first winding 41 and the second winding 42 are two windings independent from each other, each of which is formed in a vertical winding mode by a flat wire, so that the winding has four lead terminals, that is, the first lead terminal 411 and the third lead terminal 412 connected to two ends of the winding wire of the first winding 41, and the second lead terminal 421 and the fourth lead terminal 422 connected to two ends of the winding wire of the second winding 42.

At least one of the first lead terminal 411 and the third lead terminal 412 of the first winding 41 are bent and extended to a direction of the base 33 and passes through the groove 333 of the limiting part 330 on the base 33. As shown in FIG. 2, the first lead terminal 411 and the third lead terminal 412 are inserted into the corresponding grooves 333.

At least one of the second lead terminal 421 and the fourth lead terminal 422 of the second winding 42 is bent and extended to a direction of the base 33 and passes through the groove 333 of the limiting part 330 on the base 33. As shown in FIG. 2, the second lead terminal 421 and the fourth lead terminal 422 are inserted into the corresponding grooves 333.

One embodiment of the present disclosure has following advantages or beneficial effects: the magnetic column includes at least three magnetic blocks, and spacers are arranged between two adjacent magnetic blocks and/or between the magnetic block and the cover, so that multiple air gaps are formed in the magnetic column, and thus it is beneficial to reduce the winding loss caused by the high frequency current; The winding wire of the winding is flat wire and is arranged in a vertical winding manner, so as to reduce the loss caused by the line frequency current and improve the heat dissipation efficiency. Meanwhile, the base of the winding frame is provided with a limiting part, which is convenient for limiting the lead terminal of the winding, and thereby improving automation of manufacturing the magnetic component.

In the embodiments of the present disclosure, the terms "first" and "second" are merely used for the purpose of description, but cannot be understood as indicating or implying relative importance. The term "a plurality of" refers to two or more, unless otherwise explicitly defined. The terms such as "install", "connect with", "connect" and "fix" shall be broadly understood, for example, the "connect" may be direct connection, detachable connection or integral connection; the "connect with" may be direction or indirect connection through an intermediate media. For those ordinary skills in the art, the specific meanings of the above terms in the embodiments of the present disclosure can be understood depending on specific context.

In the description of the present disclosure, it is required to understood that orientation or positional relationships denoted by the terms "above", "below", "left", "right", "front", "back" are the orientation or positional relationships illustrated based on the drawings, merely for the convenience of the description of some embodiments and simplifying the description, rather than indicating or implying that the device or the unit must have a particular direction and is configured and operated in a particular orientation. Therefore, these terms are not to be construed as limiting the scope of the present disclosure.

In the description of the present disclosure, the terms "one embodiment", "some embodiments" and "particular embodiment" and the like may be directed to indicate a specific features, structures, materials or characteristics described in the embodiment or the example are contained in at least one embodiment or example of the present disclosure. In the present disclosure, the schematic representation of the above terms is not necessarily directed to the same embodiment or example. Furthermore, the specific features, structures, materials or characteristics as described above may be combined in a suitable manner in any one or more embodiments or examples.

The above are only the preferred ones of the embodiments of the present disclosure, and are not used to limit the embodiments of the present disclosure. For those skilled in the art, the embodiments of the present disclosure may have various modifications and changes. Any modification, equivalent substitution, improvement, etc. made within an idea and principle of the embodiments of the present disclosure shall be included within the protection scope of the present disclosure.

What is claimed is:

1. A magnetic component, comprising:
   two covers;
   two magnetic columns arranged between the two covers, wherein each of the magnetic columns comprises at least three magnetic blocks, spacers are arranged between two adjacent magnetic blocks and/or between the magnetic block and the cover, and the spacers form air gaps of a magnetic circuit of the magnetic component;
   a winding frame comprising two extension parts and a single base arranged at ends of the two extension parts, wherein the two extension parts are arranged on the single base and are perpendicular to the single base, a limiting part is provided in the single base, each of the two extension parts has a through channel through which the magnetic column passes; and
   windings arranged around the two extension parts respectively, wherein each winding comprises a winding wire and at least one lead terminal at an end of the winding wire, the winding wire of the winding is a flat wire, and a winding mode of the flat wire around the two extension parts are a vertical winding, wherein the at least one lead terminal after being bent is limited by the limiting part;
   wherein the magnetic component is a power factor correction inductor, and a current flowing through the winding includes a line frequency current and a high frequency current.

2. The magnetic component according to claim 1, wherein the single base comprises a supporting part connected to one end of the extension part, and the limiting part is arranged at one side of the supporting part.

3. The magnetic component according to claim 2, wherein the limiting part is provided with a through hole or a groove through which the lead terminal vertically pass, wherein the groove is formed by extending an outer edge of the limiting part to an inner direction of the limiting part.

4. The magnetic component according to claim 3, wherein a protrusion for pressing and fixing the lead terminal is arranged within the groove.

5. The magnetic component according to claim 1, wherein the spacer comprises an insulation sheet or a granular adhesive.

6. The magnetic component according to claim 1, wherein the at least three magnetic blocks have the same size.

7. The magnetic component according to claim 1, wherein the cross-sectional of the winding is contoured as a circular, a racetrack-shape or a rectangular with chamfers.

8. The magnetic component according to claim 1, wherein the magnetic component comprises two windings which are respectively arranged around the two extension parts, and the two windings are formed by winding one winding wire and the two windings totally have two lead terminals, wherein at least one of the two lead terminals is limited by the limiting part of the base.

9. The magnetic component according to claim 1, wherein the magnetic component comprises two windings which are respectively arranged around the two extension parts, and each of the two windings is formed by winding one winding wire and the two windings totally have four lead terminals, wherein at least one of the lead terminals of each of the windings is limited by the limiting part of the single base.

* * * * *